Figure 2:
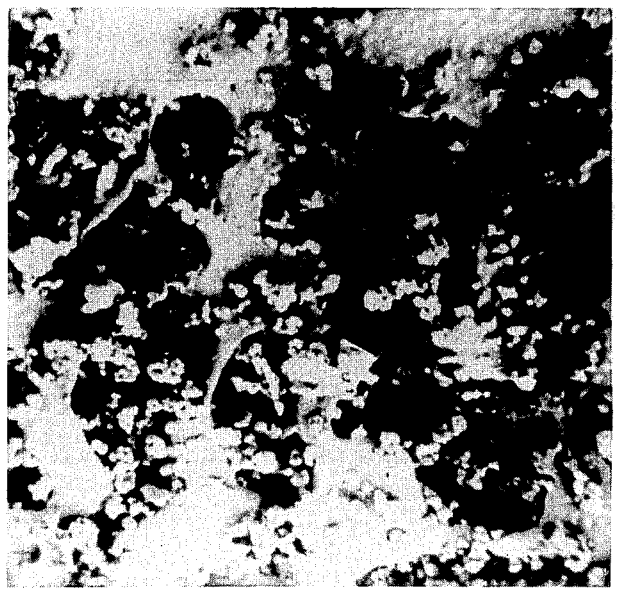

United States Patent [19]

Leonard

[11] 4,066,394

[45] Jan. 3, 1978

[54] REUSABLE ZEOLITE WATER SOFTENER FOR CLOTHES WASHING

[75] Inventor: Ralph Spencer Leonard, Berkeley Heights, N.J.

[73] Assignee: Colgate-Palmolive, New York, N.Y.

[21] Appl. No.: 537,223

[22] Filed: Dec. 30, 1974

[51] Int. Cl.$^2$ .......................... B08B 3/00; C02B 1/42; C08J 9/00; C11D 17/00
[52] U.S. Cl. .......................................... 8/137; 210/36; 210/38 A; 252/89 R; 252/90; 252/131; 252/140; 252/179; 252/DIG. 2; 252/DIG. 3; 260/2.5 AK; 260/37 N; 423/118; 423/328; 428/308; 428/331
[58] Field of Search ................... 8/137; 260/DIG. 33, 260/37 N, 2.5 AK; 428/331, 308; 117/109, 35.2, 152; 423/118, 328; 252/89 R, 90, 131, 140, 179, DIG. 2, DIG. 3; 210/36, 38 A

[56] References Cited

U.S. PATENT DOCUMENTS

| | | | |
|---|---|---|---|
| 3,033,641 | 5/1962 | Thomas | 210/38 |
| 3,266,973 | 8/1966 | Crowley | 210/502 |
| 3,382,141 | 5/1968 | Arledter et al. | 162/156 |
| 3,424,545 | 1/1969 | Bauman | 8/137 |
| 3,434,864 | 3/1969 | Haden et al. | 117/152 |
| 3,545,622 | 12/1970 | Sakhnovsky et al. | 210/502 |
| 3,686,025 | 8/1972 | Morton | 117/140 R |
| 3,687,297 | 8/1972 | Kuhn et al. | 210/502 |
| 3,755,222 | 8/1973 | Gruber et al. | 260/DIG. 33 |
| 3,870,145 | 3/1975 | Mizuno | 252/8.6 |
| 3,929,678 | 12/1975 | Laughlin et al. | 252/526 |
| 3,985,669 | 10/1976 | Krummel et al. | 252/89 |
| 4,025,427 | 5/1974 | Loeb | 210/38 A |

FOREIGN PATENT DOCUMENTS

| | | | |
|---|---|---|---|
| 813,581 | 4/1974 | Belgium. | |
| 1,542,754 | 9/1968 | France | 252/89 |
| 2,055,423 | 5/1972 | Germany. | |
| 1,143,634 | 2/1963 | Germany. | |
| 7,406,306 | 9/1974 | Netherlands. | |
| 416,430 | 3/1933 | United Kingdom | 210/502 |

*Primary Examiner*—William R. Dixon, Jr.

[57] ABSTRACT

Washing of clothes is effected in the presence of an insoluble substrate having bonded thereto an insoluble inorganic cation-exchanger.

10 Claims, 3 Drawing Figures

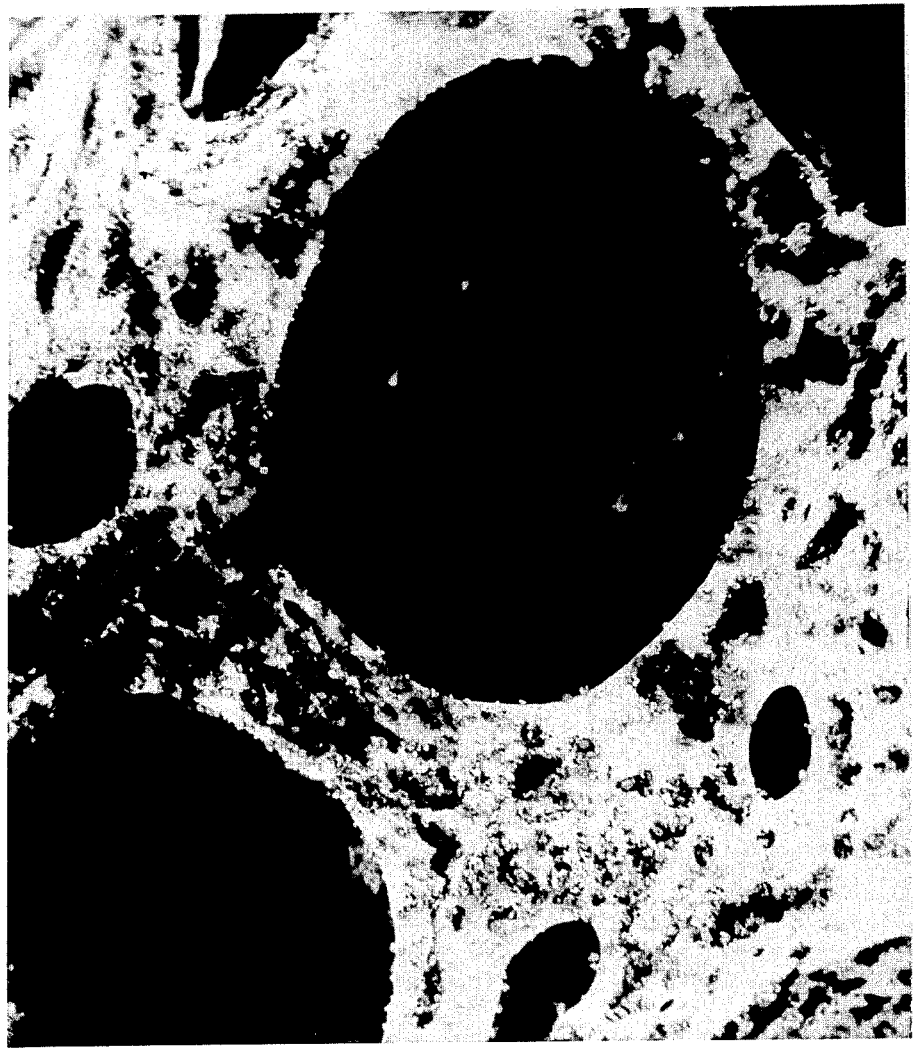
FIG 1 ←——— one millimeter ———→
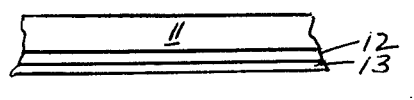
FIG 3

REUSABLE ZEOLITE WATER SOFTENER FOR CLOTHES WASHING

One aspect of this invention provides a clotheswashing product containing an insoluble inorganic cation-exchanger bonded to an insoluble substrate. The product may be added to the wash water with the clothes or it may be affixed to the washing machine so that it will come into contact with the wash water during, or prior to, the washing operation. The clothes may be washed with a low-phosphate or phosphate-free laundry composition, which may contain water insoluble builders, such builers may complex with hardness ions (e.g. Ca or Mg) and may exchange their complexed ions with the cations on the cation-exchanger. In one preferred method of practicing the invention the laundry composition added to the wash water contains organic detergent and said water-soluble builder (e.g. an ether of a hydrocarboxylic acid, particularly one whose hydroxy has been etherified with a hydroxy acid, such as O-carboxymethyl tartronic acid, O-carboxymethyl-methyl tartronic acid, dicarboxymethyl ether of dihydroxysuccinic acid or oxydisuccinic acid in addition to other conventional ingredients, such as antire-deposition agents (e.g. sodium carboxymethyl cellulose), optical brighteners, oxidizing bleaches (such as sodium perborate tetrahydrate). The use of the ion-exchanger bonded to the substrate results in a considerably lower concentration (or an elimination) of insoluble ion-exchange particles in the tub with consequent reduction in the amount of such particles that may be present (as residues) on the washed clothes and/or that may be discharged into sewage systems, while avoiding undesirable dusting.

In a preferred form the substrate has an open structure which permits the wash water to flow through it readily. Thus, as illustrated below, the substrate may be an open-celled sponge containing particles of the ion-exchanger distributed within its pores. Other substrates which may be used include papers, e.g. wet-strength paper (of cellulose fibers, as is conventional) having an adherent coating comprising the ion-exchange particles or (particularly when the wet-strength paper is of a relatively bulky porous low density type) have the ion-exchange particles within the structure of the paper itself, e.g. made by adding the ion-exchange materials to the "beater", just before the beaten pulp is formed into a web, or nonwoven structures made by incorporating the ion-exchange material into an "open" dry-laid web of fibers of cellulose or other fibers of natural or synthetic origin (e.g. rayon, nylon, polyethylene polyesters, etc.) as by spraying onto a carded or otherwise formed web. The substrate may also be of a natural or synthetic high polymer; thus it may be in the form of fibers or fibrids (e.g. of polyethylene) or other polyolefin having the particles of ion-exchanger adhesively bonded thereto or mechanically entrapped therein; or it may be a plastic film or sheet having a surface coating of the ion-exchange particles adhered thereto, particularly when the plastic film or sheet is shaped to provide a high surface area per unit projected area of material, e.g. by fluting, wrinkling, embossing, etc. In one preferred form, illustrated below, the substrate is made of hydrophilic material, but it is within the broader scope of the invention to employ substrates of hydrophobic materials. The substrate may be of insoluble material which in itself has an appreciable cation exchange capacity; e.g. of insoluble sodium carboxymethyl cellulose having a degree of substitution of less than about 0.3, such as 0.2, or of an acrylic acid or alpha-hydroxy acrylic acid polymer which may be cross-linked, e.g. by copolymerization of the monomer precurser of that polymer with a cross-linking agent such as divinylbenzene (e.g. 1 or 2% of the latter).

One preferred type of inorganic ion-exchanger is a molecular sieve zeolite, especially an aluminosilicate having at least about 1 atom of aluminum for every 3 atoms of silicon, such as an Al:Si atomic ratio of about 1:1. Thus one may employ the material known as Type A zeolite. The use of zeolite A and similar materials in detergent compositions is mentioned in recently published foreign patent applications which describe the methods of manufacture and properties of such materials as well as their chemical compositions and suitable particle sizes. It is within the broad scope of this invention to employ such materials as are appropriately described in those published applications, which include German Offenlegunschrifte No. 2,412,836 and 2,412,837 published Oct. 31, 1974.

The use of the crystalline form of a zeolite A molecular sieve is illustrated below. It is also within the broader scope of the invention to use the water-insoluble silicate in the amorphous form which is a precursor of the crystalline form; thus one may employ the amorphous materials described as aluminosilicates V, VI, VII, VIII, IX, X, XI, XIV in the above mentioned Offenlegunschrifte 2,412,837 (but preferably without the drying step mentioned therein); or one may use use the "microcrystalline" or "crystalline" forms described therein, again preferably without using the drying step it describes. Since ion-exchange is often controlled by the rate of diffusion of ions through the body of the ion-exchange material itself, the particle size of the ion-exchange material is preferably very small, such as less than 10 microns, more preferably less than 3 microns, e.g. below 1 micron, but it is within the scope of the invention to employ larger particles as illustrated in the previously mentioned published foreign patent applications.

Other inorganic ion-exchangers which may be used in place of, or in admixture with zeolite A are such aluminosilicates as clays of relatively high ion-exchange capacity such as montmorillonite (bentonite); other zeolites; felspathoids (e.g. cancrinite, nosean, sodalite); vermiculite, etc. and other inorganic ion-exchangers such as those described, for instance, in the books "Ion Exchange" by Friedrich Helfferich, published 1962 by McGraw-Hill Book Co., P. 10-14 (and references cited therein) and "An Introduction to Ion Exchange" by Russell Paterson published by Heyden & Son Ltd. (in co-operation with Sadtler Research Laboratories Inc.), p. 7-10 and 15-21.

The particles of the ion-exchanger may be bonded to the substrate in various ways. Thus they may be added to the substrate-precursors so that they are present at a stage when the substrate is in an adhesive condition. For instance, as illustrated below, they may be added to a polymerizable mixture having reactive groups before the mixture has polymerized to a non-tacky stage. Other methods include putting the substrate in adhesive condition and then applying thereto the ion-exchange particles. The surface of the substrate may be made adhesive in known manner, as by application of an adhesive, or a solvent (e.g. a volatile solvent) or softening agent which makes the substrate surface tacky or adhesive, or heat which has a similar effect. The substrate surface may also be made adhesive during, or after, the application of the ion-exchange particles; for instance, the latter may be heated and applied to the substrate surface at a stage when the surface is in a heat-softenable condition. The bonding of the particles may be affected by physical entrapment with or without adhesive bonding.

The relative proportions of inorganic ion-exchange material and substrate may vary, e.g. one may employ say about 20 to 300 parts of inorganic cation exchange particles per 100 parts of substrate.

The inorganic ion-exchange material is preferably present as a salt of a univalent cation, preferably sodium; other suitable cations are potassium, lithium, ammonium and hydrogen. Some of the products of the invention may be made under conditions in which the ion-exchanger is in contact with sufficient hard water to displace a substantial proportion of the univalent cations by calcium or magnesium ions; in that case the product may be brought to its preferred form by contact with, say, sodium chloride solution to displace the polyvalent cations by monovalent cations.

The cation-exchanger is preferably present in a hydrated state in which its exchange of cations occurs most rapidly. It may be still moist from its production (as by precipitation from solution), or it may be supplied in a dried form and the substrate carrying the dry form of the ion exchanger may be treated to cause hydration of the ion-exchanger as by soaking in water or aqueous salt solution.

When the ion-exchanger is produced from a highly alkaline medium, e.g. zeolite A made by precipitation from a solution of sodium silicate and sodium aluminate, the ion-exchanger may carry the alkaline medium with it. In cases where the free alkali is not harmful or is actually beneficial (e.g. when it can serve as a curing agent for a synthetic resin used in making the substrate) it need not be removed. For many purposes it is desirable to reduce or eliminate the alkalinity (as by water-washing, e.g. with deionized water, or by treatment with $CO_2$ to form the less alkaline sodium carbonate).

The substrate may itself be joined to a support or backing. For example, it may be bonded to pourous non-woven fabric, as described for instance in U.S. Pat. No. 3,732,652; thus a foam substrate carrying the inorganic ion-exchanger may be secured, as by flame-bonding, on one or both sides, to the non-woven fabric shown in that patent. Other substrates may be secured to backings by suitable means such as adhesives, which may be applied in spaced spots.

As indicated above, the product comprising the substrate carrying the inorganic cationic exchanger may be affixed to the washing machine. To this end it may have a pressure-sensitive adhesive layer (which may be continuous or discontinuous, e.g. in spaced spots) on one side to enable it to be secured to the inner wall of the washing machine tub; to protect the adhesive layer and maintain its tackiness during shipment and storage it may be covered by a peelable protective layer, e.g. of polyethylene. Thus the product may be supplied as a narrow width wound roll of material (e.g. 2 or 3 inches wide) comprising, say, a layer of foam or paper carrying the particles of ion-exchanger, a pressure sensitive adhesive layer and a peelable protective layer. The householder then need merely unwind, and cut or tear off, a length of material about equal to the tub circumference, strip off the peelable layer and apply the adhesive layer to the inner wall of the tub, at a level at which it will not interfere with the holes in the tube through which the wash water is driven centrifugally during the "spin" portion of the washing machine cycle, e.g. at a level above those holes. Such a strip may contain sufficient ion-exchanger to remove most of the hardness ions for several washes, after which the strip is removed and replaced by a fresh one. A strip of this kind may also be secured to the external surface of the agitator of the washing machine, or to other parts of that machine, e.g. to parts against which the incoming water, to be used for washing, will impinge. The material may also have spaced holes to be aligned with the above-mentioned holes in the tub. It may be soft and flexible or relatively stiff. The pressure-sensitive adhesive may be of conventional rubber-resin type sufficiently resistant to the heat and alkaline conditions prevailing during washing. It will be understood that the products of this invention will be present (in contact with the wash water) in the form of solids of appreciably larger dimensions than those of conventional washing powders, e.g. at least two of their three dimensions are significantly larger than one centimeter.

The following examples are given to further illustrate this invention. All parts and proportions referred to herein and in the appended Claims are by weight unless otherwise indicated.

PREPOLYMER A

A solution of 92 grams of glycerol representing 1 mole, 3 eg. OH, and 1000 grams of polyoxyethylene glycol 1000 representing 1 mole, 2 eq. OH is outgassed at 100° C and 10 Torr for 2 hours. To the outgassed solution is added 870 grams representing 5 moles tolylene diisocyanate consisting of an 80/20 mixture of 2,4/2,6 isomers. The reaction solution is stirred at 60° C for 4 hours whereupon the actual isocyanate content reaches a constant 2.49 meq. NCO/gram relative to a theoretical content of 2.54. The resin product has a pale orange color, a density of 1.10 and a viscosity (Brookfield No. 4 spindle) at 25° C of 13,400 cps. 31.3 parts of the resin product representing 50 mole percent has a theoretical molecular weight of 615 as represented by the reaction product of 1 mole of glycerol with 3 moles of tolylene diisocyanate, while 68.7 parts of the resin product representing 50 mole percent has a theoretical molecular weight of 1348 as represented by the reaction product of 1 mole of polyoxyethylene glycol, M.W. 1000, with 2 moles of tolylene diisocyanate.

PREPOLYMER B

The above procedure is repeated except for using a polyoxyethylene glycol having a weight average molecular weight of 4,000. Corresponding results are obtained.

PREPOLYMER C

A slurry of 100 grams of pentaerythritol, 0.735 mole having 2.94 eq. OH in 860 grams of tolylene diisocyanate, 4.95 moles having 9.9 eq. NCO groups/gram and the mixture ratio of 80/20 of 2,4/2,6 isomers is stirred for 24 hours. An orange solution results. To the orange solution is added 1000 grams outgassed polyoxyethylene glycol representing 1 mole having 2.0 eq. OH. These reactants are stirred at about 67° C for 4 hours followed by additional stirring at 25° C for 16 hours whereupon the isocyanate content reaches a constant level of 2.63 meq. NCO groups/gram relative to a theoretical value of 2.56. The resultant product has an orange color, a viscous consistency at 25° C, and upon analysis is found to be a solution of about 31 percent by weight (42.5 mole percent) of the reaction product of 1 mole of pentaerythritol with 4 moles of tolylene diisocyanate having a theoretical molecular weight of 832, in about 69 percent by weight (57.5 mole percent) of the reaction product of 1 mole of polyethylene glycol, M.W. 1000 with 2 moles of tolylene diisocyanate having a theoretical molecular weight of 1348.

EXAMPLE 1

| PART I | 100 grams Type A 100 sodium aluminosilicate zeolite containing approximately 20% $H_2O$.* |
|---|---|
| PART II | 10 grams Pluronic L-64** |
|  | 140 grams water (deionized) |
| PART III | 12 grams tolylene diisocyanate*** |
|  | 150 grams PREPOLYMER A |

*mean particle diameter 5.9–6.4 microns, pore sizes about 4 Angstroms
**reaction product of 60% polyoxypropylene glycol, M.W. 1750 with 40% ethylene oxide; Wyandotte
***80/20 mixture of 2,4/2,6 isomers.

PART I is thoroughly mixed into PART III with vigorous agitation after PART III is fluidized by warming to 50° C. The PART II solution is then added all at once to the PART I/III dispersion and the resulting mixture vigorously agitated until creaming occurs (about 30 seconds) caused by initial formation of visible $CO_2$ bubbles. The mix is then poured into a 9×9×2 Teflon coated pan and the foam allowed to rise and set or cure (about 5-7 minutes). The resulting zeolite-containing hydrophilic open-celled poly (urea/urethane) sponge product, desirably after drying at room or elevated temperatures up to 100° C., and cutting to any desired size, has a relatively wide range of pore sizes from about 30 to 100 pores per inch, is found to be highly effective for washing laundry in hard water, softening water containing hardness ions, extracting metal ions from aqueous metal salt solutions, and the like. Photomicrographs of the sponge product taken with a scanning electron microscope at magnification up to 500x show that relatively little zeolite is actually embedded in the polymeric material, being mostly in the form of clumps or aggregates of the zeolite particles contained in the pores of the sponge structure.

EXAMPLE 2

The procedure of Example 1 is repeated using PREPOLYMER B instead of PREPOLYMER A. Similar results are obtained.

EXAMPLE 3

The procedure of Example 1 is repeated using PREPOLYMER C instead of PREPOLYMER A. Similar results are obtained.

EXAMPLES 4, 5 and 6

The procedures of Examples 1, 2 and 3 are repeated, but with the omission of the tolylene diisocyanate from PART III. A slightly denser sponge structure is obtained.

EXAMPLES 7, 8 and 9

The procedures of Examples 1, 2 and 3 are repeated, except that PART I is first thoroughly mixed with PART II instead of PART III, and the resulting dispersion then thoroughly mixed into the warmed PART III. Similar results are obtained.

EXAMPLES 10, 11 and 12

The procedures of Examples 7, 8 and 9 are repeated, but with the omission of the tolylene diisocyanate from PART III. A slightly denser sponge structure is obtained.

EXAMPLES 13, 14 and 15

The procedures of Examples 1, 2 and 3 are repeated but using a zeolite containing about 1-2% $H_2O$. Similar results are obtained.

EXAMPLES 16, 17 and 18

The procedure of Examples 1, 2 and 3 are repeated except that the indicated zeolite is replaced by one having a type A crystalline structure, an average pore size of 8 Angstroms, an average particle size of 8.3 microns, and a moisture content of 21% (Linde Type 4A moleculer sieve, Union Carbide Corp.)

EXAMPLE 19

(A) A Tergotometer bucket is charged with 1000 ml. of 100 ppm (Ca++) water and maintained at about 50° C. The agitator is started and run at 100 rpm. and a zero time measurement of the calcium ion content taken with a Corning calcium ion titration device. At time zero a 2×2×½ inch piece of sponge produced by suitable operation of the procedure of Example 1 above to contain 0.5 grams of the zeolite is dropped into the bucket and agitation continued for 15 minutes. After 1, 2, 5, 10 and 15 minutes, aliquots are withdrawn and the amount of calcium ion determined as shown in Table I below in which the values are in ppm. of Ca++.

B. For comparative purposes, the above procedure is repeated except that instead of the zeolite-impregnated sponge, 0.5 grams of the free particulate zeolite is added to the water. The results are also shown in Table I below.

C. Also for comparison, a control procedure is conducted in which no zeolite or zeolite-impregnated sponge is used. The results are also shown in Table I below

TABLE I

| Minutes | A Zeolite Sponge | B Zeolite Particles | C No Zeolite |
|---|---|---|---|
| 0 | 100 | 100 | 100 |
| 1 | 30 | 7 | 100 |
| 2 | 22 | 3 | 100 |
| 5 | 16 | 2 | 100 |
| 10 | 10 | 2 | 100 |
| 15 | 8 | 1 | 100 |

It is readily seen that the sponge product of the invention is highly effective for softening hard water, being as expected slightly slower in withdrawing Ca++ ion from the water as compared with the use of zeolite particles per se but being almost as effective after 15 minutes contact. The temperature of treatment is relatively immaterial, similar procedures conducted at about 20° C yielding similar results. Analysis of the aliquot taken after 10 minutes in paragraph A above indicates that a minor proportion of the zeolite in the sponge escapes into the water.

EXAMPLE 20

A detergent concentrate is prepared by thoroughly mixing at 25° C. the following components:
20% nonionic detergent*
20% sodium silicate, $Na_2:SiO_2 = 1:2.35$
0.7% sodium carboxymethylcellulose
59.3% tap water

*Neodol25-7, reaction product of about 7 moles of ethylene oxide with 1 mole of $C_{12-15}$ linear primary alcohols; Shell Chemical Co.

The above concentrate is employed at a wash water concentration of about 0.15% together with a sponge product as produced in Example 1 above containing the zeolite in a wash water concentration of 0.05% in an automatic washing machine for washing soiled nylon, cotton, polyester (Dacron), and cottonpolyester blend fabrics soiled with, e.g. particulate and oily soils such as clay and carbon soils, skin soil, natural and artificial sebum soils.

Instead of the detergent concentrate composition described in Example 20 above, one may employ the detergent compositions described in the previously mentioned published foreign applications (relating to use of zeolites in laundry compositions) except that the zeolite portion of such compositions will be wholly or partially (e.g. half) omitted, the zeolite being provided by the presence of the zeolite-containing sponge product.

FIGS. 1 and 2 are photomicrographs (taken, as mentioned in Example 1 above, with a scanning electron microscope) of a product made in accordance with the foregoing Examples. The scale of each photograph is indicated at its side. It will be seen that, in the particular illustrated sponge, a considerable proportion of the particulate ion-exchanger is present as aggregates or clumps of particles contained in and trapped in, the smaller pores of the sponge.

FIG. 3 illustrates, schematically, a product of this invention comprising a layer 11 of substrate carrying particles of ion-exchanger, a pressure-sensitive adhesive layer 12 and a layer 13 of peelable protective material.

In the foregoing Examples the substrate is a hydrophilic open-celled poly (urea/urethane) sponge derived from a prepolymer produced by reaction of a polyoxyalkylene polyol with a stoichiometric excess of an organic polyisocyanate, said sponge containing the ion-exchanger distributed on its pore walls and within the pores. The sponge may also contain a surface active agent, especially a nonionic surface active agent such as polyoxyethylenated polyoxypropylene glycol. In the method of preparing the improved ion-exchanging sponge described in the above Examples, the water reacts in known manner with isocyanate groups in the prepolymer to release carbon dioxide gas bubbles which produce the desired foam or sponge product containing uniformly distributed within the pores thereof the above described zeolite or other ion exchange material in readily accessible form due to the open pore or cell structure of the sponge product.

Methods of preparing hydrophilic open celled poly (urea/urethane) sponges or foams from an isocyanate capped prepolymer produced by reaction of a polyoxyalkylene polyol with a stoichiometric excess of an organic diisocyanate, by addition thereto and reaction therewith of suitable proportions of water, especially relatively large amounts of water ranging from about 30 to 200% by weight of the prepolymer, are known and no claim is accordingly made thereto per se. For example, reference is made to such methods and products disclosed in U.S. Pat. No. 3,833,386, which disclosures are incorporated herein by such reference. Somewhat similar disclosures are to be found in U.S. Pat. Nos. 3,598,772 and 3,171,820, in "German Plastics Practice" published by Debell and Richardson, 1946, Chapter 21, "Plastic Foams," pages 462–465 and in "Papers Presented at the Atlantic Meeting: Synthesis of Isocyanate Polymers" published by the American Chemical Society, Division of Paints, Plastics and Printing Ink Chemistry, September, 1956.

According to a preferred embodiment, the isocyanate capped prepolymer is formulated in such a manner as to give crosslinked, three dimensional network polymers on reaction with water to cause foaming, namely by use of a prepolymer having an average isocyanate functionality greater than 2 and up to about 6 or more depending on the composition of the polyol and capping agent components. In general, such prepolymers may be prepared by reacting a polyol having an average hydroxyl functionality greater than 2, such as polyoxyethylenated glycerol, trimethylolpropane, trimethylolethane, tetramethylolbutane, pentaerythritol, or sucrose or mixtures thereof or the like, with a stoichiometric excess of an organic, preferably aromatic, diisocyanate or polyisocyanate or mixture thereof.

Alternatively, any polyoxythylenated polyol or mixture thereof may be reacted with polyisocyanate having an average isocyanate functionality greater than 2 such as triphenyl methane-4,4',4''-triisocyanate, benzene-1,3,5-triisocyanate, toluene-2,4,6-triisocyanate, PAPI (Upjohn; polymethylene polyphenylisocyanate having nearly 3 isocyanate groups per molecule and an isocyanate equivalent weight of 133; U.S. Pat. No. 2,683,730), or mixtures thereof or the like.

The polyoxyethylene polyol reactants are water soluble reaction products derived from the polymerization of ethylene oxide in the presence of a polyhydroxy compound such as water, ethylene glycol, propylene glycol, butylene glycol, diethylene glycol, and the polyhydroxy compounds described above and may have a weight average molecular weight of about 200 to 20,000, preferably about 600 to 6,000. These polyols may contain up to 40 mole percent, preferably up to 25 mole percent or less of a relatively hydrophobic comonomer such as propylene or butylene oxide in the form of a random or block copolymer.

Useful polyisocyanates other than those referred to above include the following diisocyanates: xylene —, chlorophenylene—, diphenylmethane — 4,4' —, naphthalene —1,5—, 3,3' — dimethyl — 4,4' —, biphenylene —, 2,2',5,5' — tetramethyl — 4,4' — biphenylene —, 4,4' — sulfonylbis (phenyl) —, 4,4' — methylene orthotolyl —, hexamethylene —, ethylene —, trimethylene —, tolyene diisocyanate, the corresponding isothiocyanates, and the like. The mixed 80/20 tolylene 2,4/2,6 isomers are preferred.

A stoichiometric excess of the polyisocyanate reactant is generally employed to assure complete capping, such as in about 1.1 to 4:1 preferably about 2 to 3:1 molar ratio of isocyanate to hydroxyl. The reaction may be carried out in an inert moisture-free atmosphere such as under a nitrogen blanket at atmospheric pressure at a temperature in the range of from about 0° C to about 120° C for up to 20 or more hours. The resulting prepolymers used in the above Examples are usually water-soluble.

In contrast to the usual polyurethane foam reactisns involving use of the theoretical ½ mole of water per mole of — NCO, the process illustrated in the Examples employ from about 30 to 200% of water by weight of the capped prepolymer, or about 6.5 up to about 390 moles of water, desirably about 20 to 200 moles of water per NCO group. The products are hydrophilic and easily wet by water; typically foams having densities from 3 to 6 lbs/ft.3 hold 10 to 20 times their own weight of water and the wet foams dry out very fast. It will be understood however that the invention may be practiced with materials, such as polyurethanes, which do not have such hydrophilic characteristics and which may be relatively hydrophobic so long as the structure is open enough for water to penetrate it and come in contact with the inorganic ion-exchanger therein.

An effective additive to the aqueous reactant component employed in making the sponge products of this invention is a surfactant or a mixture of surfactants which may be anionically, but more preferably nonionically, surface active. The use of such surfactant additive tends to stabilize and improve the foaming reaction, may more effectively disperse the ion exchange material when the latter is preliminarily added to the aqueous reactant instead of to the prepolymer, yield a better and more uniform sponge structure, and may facilitate contact between the ion exchange material entrapped in the sponge structure and the aqueous medium (e.g., wash water, hard water, etc.) being treated by the sponge products of this invention.

Suitable surfactants of the nonionic type include, for example, polyoxyethylenated (e.g., with about 2 to 20 moles of ethyleneoxide) higher molecular weight reactive hydrogen-containing compounds of about 6 to 20 or more (e.g., 50 carbons) carbon atoms including fatty acids such as palmitic acid, monohydric and polyhydric alcohols such as Oxotridecyl alcohol (e.g., from tetrapropylene or triisobutylene), oleylalcohol, laurylalcohol and preferably polypropylene glycol, and alkyl phenols such as nonyl phenol, and mixtures thereof.

Suitable surfactants of the anionic type include the sodium, potassium, ammonium and amine salts of the sulfates and primary and secondary phosphate esters of the above-mentioned polyoxyethylenated nonionic surfactants, such salts of higher fatty acids (soaps), of alkyl aryl sulfonic acids such as dodecyl benzene sulfonic acid, of aliphatic sulfonic acids such as the well known olefin sulfonates and paraffin sulfonates of fatty alcohol sulfates and phosphates such as lauryl sulfate and phosphate, of the sarosinic acids, of lauryl sulfoacetic acid, of M-acyl tauride, of higher molecular weight ethers and esters of isethionic acid, and the like. These include alkyl ether sulfates, e.g. a mixture of alkyl ether sulfates, said mixture having an average (arithmetic mean) carbon chain length within the range of from about 12 to 16 carbon atoms, preferably from about 14 to 15 carbon atoms, and an average (arithmetic mean) degree of ethoxylation of from about 1 to 4 moles of ethylene oxide, preferably from about 2 to 3 moles of ethylene oxide.

In preparing the ion-exchanging sponge products illustrated in the Examples above, there are in general employed, by weight of the prepolymer, about 30 to 200% and preferably about 80 to 120% of water, preferably deionized, about 25 to 100% and preferably about 40 to 60% of the ion exchange material, preferably zeolite, and about 2 to 10% and preferably about 5 to 8% of the surfactant, preferably nonionic. The surfactant should be preliminarily admixed with or dissolved in the water or aqueous reactant component, and the ion exchange material may be preliminarily thoroughly admixed with either the water reactant component or the prepolymer component. Desirably, about 2 to 20%, preferably about 5 to 10%, of dissocyanate reactant, preferably tolylene dissocyanate, by weight of the prepolymer is also preliminarily added thereto for the purpose of obtaining a lower density, larger pore size sponge structure. Adjustment of the above proportions may be made to produce a more flexible or more rigid foam or sponge structure as desired.

The foaming or sponge-producing reaction between the water reactant and the isocyanate-capped prepolymer is carried out in known manner, as by simply and quickly thoroughly mixing them prior to initiation of substantial gas bubble formation, pouring the mixture into a mold, on a moving belt, or the like, and permitting the foam to rise and set. The reaction is exothermic, and may be controlled if desired within a temperature range of about 10° to 100° C. Higher temperatures within this range hasten the reaction, as would inclusion of known catalysts such as tin compounds, for example stannous octoate, and amines, for example trimethyl amine, N-methyl- and N-ethyl-morpholine and the like.

Following completion of the foaming reaction, generally in about 1 to 10 minutes, the impregnated sponge product may be dried, if desired under vacuum of 1 to 760 Torr at a temperature of about 0° to 150° C; the wet or dry sponge product is useful for softening hard water (i.e., containing calcium and/or magnesium ions) in the washing of laundry in aqueous media containing hardness ions. Other possible uses are extracting ions such as metals from substances dissolved in aqueous media such as salts of metals including aluminum, barium, antimony, bismuth, cadium, cobalt, copper, gold, iron, lead, manganese, nickel, palladium, platinum, silver, strontium, tin, titanium, zinc, zirconium and the like, and for a number of other uses including dehydration, adsorption, analysis and the like.

The substate and ion-exchanger should be substantially insoluble in water and in alkaline washing solutions (which may have a pH of about 9, 10 or 11, for instance) under the washing conditions which may involve contact with the agitated washing solution (which may be cool or hot, e.g., at about 80, 100, 120 or even 140 or 200° F.) for, say, about 5 to 20 minutes or more (e.g., 1 hr.) followed by contact with the rinse water for some minutes, for each washing operation. While the polyurethane of the sponge used in the above Examples is hydrophilic, it is nevertheless substantially insoluble under such conditions.

As previously indicated, the insoluble substrate-ion exchanger combination may be employed in the washing together with separately added water-soluble detergent composition. It is within the broader scope of the invention to combine all or part of the water-soluble detergent composition with the substrate-ion exchanger product. For instance, as illustrated in Example 1, a soluble organic detergent or other component of the detergent composition may be included during the manufacture of the product. The ingredients of the water-soluble detergent composition may also be post-added to the product. Thus, the entire detergent composition (including organic detergent, water-soluble builder(s), antiredeposition agent and fluorescent dye or optical brightener) may be coated onto or impregnated into pre-formed structure (such as a sheet) of the insoluble substrate carrying the insoluble cation-exchanger and the coated or impregnated structure may be cut (or scored for easy tearing by the householder) into individual pieces of a size to provide sufficient material for washing one load of cloths.

Also, pieces of the insoluble substrate-insoluble ion-exchanger combination may be packaged separately or together with the water-soluble detergent composition. For instance, a number of such pieces may be included in the box containing the detergent composition in granular or powder form (e.g., in the form of hollow spray-dried beads) whereupon the detergent composition may become partially or wholly embedded in the structure of the product so as to cling to each piece when it is removed from the box for use. Similarly, the pieces may be supplied in a container also containing a liquid (e.g., an aqueous liquid) detergent composition so that on removal for use they will carry such detergent liquid therewith.

Suitable water-soluble detergent compositions for use with the product of this invention may be those given in Examples 2, 3, 4, 5, 6a, 6b, 7 and 8 of the previously mentioned Auslegeschrift 2412,837, minus the aluminosilicate. Other compositions include (a) a mixture of 25 parts surfactant (e.g., 20 parts sodium linear alkylbenzenesulfonate having an average of 12 carbons in the alkyl, 5 parts coconut fatty alcohol-ethylene oxide condensate containing 6 mols ethylene oxide per mol of fatty alcohol), 15 parts sodium silicate ($Na_2O:SiO_2$ ratio 1:2.3), 20 parts sodium citrate, 5 parts sodium acetate, and 0.2 part optical brightener; (b) 35 parts sodium olefin sulfonate having an average of 16 carbon atoms, 15 parts sodium citrate, 0.5 part optical brightener; (c) 54 parts sodium soap (90 tallow fatty acid, 10 coconut fatty acid), 11 parts sodium ethyoxylated tallow alkyl sulfate having about 3 ethylene oxide units per molecule, 9 parts sodium linear alkylbenzenesulfonate having an average of about 12 carbon atoms in the alkyl, 9 parts sodium silicate (as above), 12 parts sodium citrate, 0.6 part optical brightener; (d) composition c containing 3 parts sodium perborate; (e) 15 parts sodium salt of ethyoxylated tallow alkyl sulfate containing about 3 ethylene oxide units, 3 parts sodium tallow alkyl sulfate, 13 parts sodium silicate (as above); (f) a mixture as in e containing 20 parts sodium tripolyphosphate in place of the sodium silicate; in each of the foregoing sodium carboxymethyl cellulose (e.g., about 0.5 to 3 parts) may be included.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

I claim:

1. A method of washing soiled textiles comprising the step of agitating said soiled textiles in an aqueous washing solution at a temperature in the range of 80° F. to 200° F. in a washing machine in the presence of (A) a detersive proportion of a water-soluble nonionic or anionic surfactant and (B) a product comprising 20 to 300 parts by weight of particles of a water-insoluble, inorganic aluminosilicate having at least about one atom of aluminum for every three atoms of silicon, a cation selected from the group consisting of sodium, potassium, ammonium, lithium and hydrogen, and a particle size of less than ten microns incorporated in 100 parts by weight of a water-insoluble hydrophilic poly(urea/urethane) substrate having an open porous structure, said product being effective to remove calcium and magnesium ions from said washing solution.

2. A product as in claim 1 in which said ratio is about 1:1.

3. A method in accordance with claim 1 wherein said surfactant is separately added to said aqueous washing solution.

4. A method in accordance with claim 1 wherein all or a portion of said surfactant is a component of said product.

5. A method in accordance with claim 1 wherein said aqueous washing solution further includes a water-soluble detergent builder salt.

6. A product for use in contact with the wash water in a clothes washing machine during the washing of soiled textiles which comprises 20 to 300 parts by weight of particles of amorphous or hydrated, water-insoluble inorganic aluminosilicate having at least one atom of aluminum for every three atoms of silicon, a cation selected from the group consisting of sodium, potassium, ammonium, lithium or hydrogen, and a particle size of less than 10 microns incorporated in 100 parts by weight of a water-insoluble substrate comprising a hydrophilic poly(urea/urethane) in the form of a sponge having about 30 to 100 pores per inch, said aluminosilicate being distributed on the pore walls and within the pores and said product being effective to remove calcium ions from said wash water.

7. A product as set forth in claim 6 wherein said aluminosilicate is a synthetic sodium zeolite of Type A.

8. A product as in claim 6 in which said ratio of aluminum to silicon is about 1:1.

9. A product as in claim 6 wherein said polymer is derived from a prepolymer produced by reaction of a polyoxyalkylene polyol with a stoichiometric excess of an organic polyisocyanate.

10. A product as set forth in claim 6 which further includes about 2% to 10% by weight of a nonionic or an anionic surfactant.

* * * * *